United States Patent
Gaussier et al.

(10) Patent No.: US 7,620,539 B2
(45) Date of Patent: Nov. 17, 2009

(54) METHODS AND APPARATUSES FOR IDENTIFYING BILINGUAL LEXICONS IN COMPARABLE CORPORA USING GEOMETRIC PROCESSING

(75) Inventors: Eric Gaussier, Eybens (FR); Jean-Michel Renders, Saint-nazaire-les-eymes (FR); Herve Dejean, Grenoble (FR); Cyril Goutte, Le Versoud (FR); Irina Matveeva, Chicago, IL (US)

(73) Assignee: Xerox Corporation, Norwalk, CT (US)

( * ) Notice: Subject to any disclaimer, the term of this patent is extended or adjusted under 35 U.S.C. 154(b) by 654 days.

(21) Appl. No.: 10/976,847

(22) Filed: Nov. 1, 2004

(65) Prior Publication Data
US 2006/0009963 A1    Jan. 12, 2006

Related U.S. Application Data

(60) Provisional application No. 60/586,714, filed on Jul. 12, 2004.

(51) Int. Cl.
- G06F 17/28 (2006.01)
- G06F 17/20 (2006.01)
- G06F 17/27 (2006.01)
- G06F 17/21 (2006.01)
- G06F 17/30 (2006.01)

(52) U.S. Cl. .................. 704/2; 704/4; 704/5; 704/8; 704/9; 704/10; 715/256; 715/259; 715/264; 707/7

(58) Field of Classification Search ............. 704/2, 704/8, 9, 10, 4, 5; 715/256, 259, 264; 707/3
See application file for complete search history.

(56) References Cited

U.S. PATENT DOCUMENTS

| | | | | |
|---|---|---|---|---|
| 5,325,298 | A * | 6/1994 | Gallant | 704/9 |
| 5,907,821 | A * | 5/1999 | Kaji et al. | 704/4 |
| 6,006,221 | A * | 12/1999 | Liddy et al. | 707/5 |
| 6,236,958 | B1 * | 5/2001 | Lange et al. | 704/8 |
| 6,523,026 | B1 * | 2/2003 | Gillis | 707/3 |
| 6,611,825 | B1 * | 8/2003 | Billheimer et al. | 706/45 |
| 6,694,311 | B1 * | 2/2004 | Smith | 707/4 |
| 6,876,998 | B2 * | 4/2005 | Evans | 707/3 |
| 6,885,985 | B2 * | 4/2005 | Hull | 704/2 |
| 6,990,628 | B1 * | 1/2006 | Palmer et al. | 715/234 |
| 7,047,182 | B2 * | 5/2006 | Masuichi | 704/7 |
| 7,054,803 | B2 * | 5/2006 | Eisele | 704/2 |
| 7,124,073 | B2 * | 10/2006 | Tokuda et al. | 704/2 |
| 7,249,012 | B2 * | 7/2007 | Moore | 704/4 |

(Continued)

OTHER PUBLICATIONS

T. S. Jaakkola and D. Haussler. Exploiting generative models in discriminative classifiers. Preprint, Dept. of Computer Science, Univ. of California, available from http://www.cse.ucsc.edu/~haussler/pubs.html, 1998. http://citeseer.ist.psu.edu/jaakkola98exploiting.html.*

(Continued)

*Primary Examiner*—David R Hudspeth
*Assistant Examiner*—Paras Shah
(74) *Attorney, Agent, or Firm*—Fay Sharpe LLP (57) ABSTRACT

Various methods formulated using a geometric interpretation for identifying bilingual pairs in comparable corpora using a bilingual dictionary are disclosed. The methods may be used separately or in combination to compute the similarity between bilingual pairs.

25 Claims, 6 Drawing Sheets

U.S. PATENT DOCUMENTS

| | | | |
|---|---|---|---|
| 2002/0123982 A1* | 9/2002 | Masuichi | 707/1 |
| 2002/0128821 A1* | 9/2002 | Ehsani et al. | 704/10 |
| 2003/0115188 A1* | 6/2003 | Srinivasa et al. | 707/3 |
| 2005/0021323 A1* | 1/2005 | Li | 704/5 |

OTHER PUBLICATIONS

Tiedeman, Jorg. Automatic Lexicon Extraction from Aligned Bilingual Corpora. Thesis. Otto-von-Guericke-Univesittat Magdeburg, Sep. 1997.*

Dumais, S.; Letsche, T.; Littman, M. L.; and Lan-dauer, T. 1997. Automatic cross-language retrievalusing latent semantic indexing. In AAAI Symposiumon Cross-Language Text and Speech Retrieval. Amer-ican Association for Articial Intelligence.*

Jiang, F. and Littman, M. L. 2000. Approximate Dimension Equalization in Vector-based Information Retrieval. In Proceedings of the Seventeenth international Conference on Machine Learning (Jun. 29-Jul. 2, 2000). P. Langley, Ed. Morgan Kaufmann Publishers, San Francisco, CA, 423-430.*

Chiao, Y. and Zweigenbaum, P. 2002. Looking for candidate translational equivalents in specialized, comparable corpora. In Proceedings of the 19th international Conference on Computational Linguistics—vol. 2 (Taipei, Taiwan, Aug. 24-Sep. 1, 2002). International Conference on Computational Linguistics. Association for Computational Lin.*

Déjean, H., É Gaussier and F. Sadat, "Bilingual Terminology Extraction: An Approach based on a Multilingual thesaurus Applicable to Comparable Corpora," Proceedings of the 19th International Conference on Computational Linguistics COLING 2002, Taipei, Taiwan, pp. 218-224.*

Probst, K. 2003. Using 'smart' bilingual projection to feature-tag a monolingual dictionary. In Proceedings of the Seventh Conference on Natural Language Learning At HLT-NAACL 2003—vol. 4 (Edmonton, Canada). Human Language Technology Conference. Association for Computational Linguistics, Morristown, NJ, 103-110. DOI= http://dx.doi.org/10.3115/1.*

Sahlgren, M. and Karlgren, J. 2005. Automatic bilingual lexicon acquisition using random indexing of parallel corpora. Nat. Lang. Eng. 11, 3 (Sep. 2005), 327-341. DOI= http://dx.doi.org/10.1017/S1351324905003876.*

Daille, Beatrice et al. "French-English Terminology Extraction from Comparable Corpora". Lecture Notes in Computer Science. vol. 3651/2005, Springer 2005.*

Sadat, F., Yoshikawa, M., and Uemura, S. 2003. Learning bilingual translations from comparable corpora to cross-language information retrieval: hybrid statistics-based and linguistics-based approach. In Proceedings of the Sixth international Workshop on information Retrieval with Asian Languages, vol. 11 (Sapporo, Japan, Jul. 7-7, 2003), 57-64.*

Bach and Jordan, "Kernel independent component analysis" in Journal of Machine Learning Research, vol. 3, pp. 1-48, 2002.

Besancon, Rajman and Chappelier, "Textual similarities based on distributional approach", Proceeding of the Tenth International Workshop on Database and Expert Systems Applications, DEX'99, Florence, Italy, 1999.

Deerwester, Dumais, Furnas, Landauer, and Harshman, "Indexing by latent semantic analysis", Journal of the American Society for Information Science, 41 (6), pp. 391-407, 1990.

Dejean, Gaussier and Sadat, "An approach based on multilingual thesauri and model combination for bilingual lexicon extraction", In International Conference on Computational Linguistics, COLING 2002.

Dempster, Laird and Rubin, "Maximum likehood from incomplete data via the EM algorithm", Journal of the Royal Statistical Society, Series B, 39(1), pp. 1-38, 1977.

Diab, Finch, "A statistical word-level translation model for comparable corpora", Proceeding of the Conference on Content-Based Multimedia Information Access, 2000.

Dunning, T, "Accurate methods for the statistics of surprise and coincidence" Computational Linguistics, 19(1), pp. 61-74, 1993.

Fung, "Statistical View on Bilingual Lexicon Extraction: from Parallel Corpora to Non-parallel Corpora", Lecture Notes in Artificial Intelligence, Springer Publisher, vol. 1529, pp. 1-17, 1998.

Gaussier, E., Goutte, C., Popat, K. and Chen, F, "A hierarchical model for clustering and categorizing documents", ECIR, Glasgow, pp. 229-247, 2002.

Gaussier, Eric, Jean-Michel Renders, Irina Matveeva, Cyril Goutte, Hervé Déjean, "A Geometric view on bilingual lexicon extraction from comparable corpora", 42nd Annual Meeting of the Association for Computational Linguistics, Barcelona, Spain, Jul. 25-26, 2004.

Grefenstette, Chapter 5.3 Word Meaning Clustering, in "Explorations in Automatic Thesaurus Discovery", Kluwer Academic Publishers, pp. 126-131, 1994.

Hofmann, "Probabilistic latent semantic analysis" Proceedings of the Fifteenth Conference on Uncertainty in Artificial Intelligence, pp. 289-296, 1999.

Hofmann, "Learning the similarity of documents: An information-geometric approach to document retrieval and categorization", Research and Development in Information Retrieval, pp. 369-371, 2000.

Jaakkola and Haussler, "Exploiting generative models in discriminative classifiers", Advances in Neural Information Processing Systems, vol. 11, pp. 487-493, 1999.

Koehn and Knight, "Learning a translation lexicon from monolingual corpora", ACL Workshop on Unsupervised Lexical Acquisition, 2002.

Lewis, Baxendale and Bennet, "Statistical discrimination of the synonym/antonym relationship between words", Journal of the ACM, 14(1), pp. 20-44, Jan. 1967.

Peters, Picchi, "Capturing the comparable: A system for querying comparable text corpora", JADT—$3^{rd}$ International Conference on Statistical Analysis of Textual Data, pp. 255-262, 1995.

Rapp, "Identifying word translations in nonparallel texts", Proceedings of the Annual Meeting of the Association for Computational Linguistics, 1995.

Rapp, "Automatic Identification of word translations from unrelated English and German corpora", ACL Proceedings, 1999.

Renders, Dejean and Gaussier, "Assessing Automatically Extracted Bilingual Lexicons for CLIR in Vertical Domains: XRCE participation to the GIRT track of CLEF 2002", M.Braschler, J.Gonzalo and M.Kluck (Eds), Lecture Notes in Computer Science, Springer Verlag, 2003.

Shahzad, Ohtake, Masuyama and Yamamoto, "Identifying translations of compound nouns using non-aligned corpora", Proceedings of the Workshop MAL, pp. 108-113, 1999.

Tanaka and Iwasaki, "Extraction of lexical translations form non-aligned corpora", International Conference on Computational Linguistics, COLING 1996.

Ueda and Nakano, "Deterministic annealing variant of the EM algorithm", Advances in Neural Information Processing Systems 7, pp. 545-552, 1995.

Vinokourov, Shawe-Taylor and Cristianini, "Finding language-independent semantic representation of text using kernel canonical correlation analysis", Advances in Neural Information Processing Systems 12, 2002.

Vinokourov, Shawe-Taylor and Cristianini, "Inferring a semantic representation of text via cross-language correlation analysis", Advances in Neural Information Processing Systems 15, 2003.

* cited by examiner

METHODS AND APPARATUSES FOR IDENTIFYING BILINGUAL LEXICONS IN COMPARABLE CORPORA USING GEOMETRIC PROCESSING

CROSS REFERENCE TO RELATED APPLICATION

Priority is claimed from U.S. Provisional Application No. 60/586,714, filed Jul. 12, 2004, entitled "Method And Apparatus For Identifying Bilingual Lexicons In Comparable Corpora", by the same inventors and assignee, which is incorporated herein by reference.

BACKGROUND AND SUMMARY

The present invention relates generally to methods, and apparatus therefor, for extracting bilingual lexicons from comparable corpora using a bilingual dictionary.

Bilingual documents with comparable corpora contain text written in different languages that, as defined herein, refer to a similar topic, but are not translations of each other (i.e., parallel corpora). That is, while corpora that are comparable "talk about the same thing", corpora that are parallel are direct or mutual translations that maximizes comparability (e.g., as found in a bilingual dictionary). Except for multilingual documents produced by translation for international or government organizations (e.g., parallel product documentation), most multilingual corpora are not parallel but instead comparable (e.g., comparable news stories). However, while few applications produce bilingual lexicons extracted from parallel corpora, many applications require bilingual lexicons.

Thus, due to the limited availability of parallel corpora, methods exist for extracting bilingual lexicons from comparable corpora. Some of these known methods of bilingual lexicon extraction from comparable corpora (BLEFCC) are described, for example, in the following publications, which are incorporated herein by reference and hereinafter referred to as the "BLEFCC References": Rapp, "Identifying Word Translations In Nonparallel Texts", in Proceedings of the Annual Meeting of the Association for Computational Linguistics, 1995; Peters et al., "Capturing The Comparable: A System For Querying Comparable Text Corpora", in JADT'95—3rd International Conference on Statistical Analysis of Textual Data, pages 255-262, 1995; Tanaka et al., "Extraction Of Lexical Translations From Non-Aligned Corpora", in International Conference on Computational Linguistics, COLING'96, 1996; Shahzad et al., "Identifying Translations Of Compound Nouns Using Non-Aligned Corpora", in Proceedings of the Workshop MAL'99, pages pp. 108-113, 1999; Fung et al., "A Statistical View On Bilingual Lexicon Extraction—From Parallel Corpora To Nonparallel Corpora", in J. Veronis, editor, Parallel Text Processing, Kluwer Academic Publishers, 2000.

Bilingual lexicon extraction from comparable corpora as described in the BLEFCC References relies on the assumption that if two words are mutual translations, then their more frequent collocates, in a broad sense, are likely to be mutual translations as well. Based on this assumption, the approach described in the BLEFCC References for extracting bilingual lexicons from comparable corpora builds context vectors for each target word, translates the target context vectors using a bilingual dictionary, and compares the translation context vector with the target context vector.

With these known methods, two problems of "coverage" and "polysemy/synonymy" are known to exist when using a bilingual dictionary to extract bilingual lexicons from comparable corpora. The first problem of coverage occurs when too few corpus words are covered by the bilingual dictionary. However, if the context of the bilingual dictionary is large enough, the method described in the BLEFCC References should contend with the problem of coverage with frequently used words (as opposed to rare words) since it is likely that some context words will belong to the general language.

The second problem of polysemy/synonymy associated with the use of bilingual dictionaries to extract bilingual lexicons from comparable corpora arises when dictionary entries have the same meaning (i.e., synonymy) or several meanings (i.e., polysemy), which becomes more significant when only one meaning is represented in the corpus. The method described in the BLEFCC References does not contend well with the polysemy/synonymy problem because all entries on either side of the bilingual dictionary are treated as orthogonal.

Similarities with respect to synonyms should preferably not be independent, which the method described in the BLEFCC References does not take into account. As will be seen in more detail below in one geometric embodiment, axes corresponding to two synonyms $s_i$ and $s_j$ are orthogonal, so that projections of a context vector on synonyms $s_i$ and $s_j$ will in general be uncorrelated. Consequently, this geometric embodiment provides that a context vector that is similar to synonym $s_i$ may not necessarily be similar to synonym $s_j$.

Similar to synonymous entries in a bilingual dictionary, similarity with respect to polysemous entries should not be considered independent. For example, the word "bank" in English means either a "financial institution" (having French translation "banque") or the "ground near a river" (having French translation "berge"). If only the English/French pair bank/banque were to appear in a bilingual dictionary, the method described in the BLEFCC References would consider the English word "river", which co-occurs with "bank", similar to the French word "argent" (meaning "money" in English), which co-occurs with "banque" (meaning "financial institution" in French).

As the availability of comparable corpora increases (e.g., newspaper articles or patent documents published in different languages), it would be advantageous to provide improved methods for extracting bilingual lexicons from comparable corpora that solves these and other problems. Such improved methods would advantageously optimize the use of existing bilingual dictionaries by, for example, augmenting existing bilingual dictionaries when extracting bilingual lexicons from comparable corpora.

Accordingly embodiments of a method, system and article of manufacture therefor, for extracting bilingual lexicons from comparable corpora using a bilingual dictionary are disclosed herein. The embodiments consider the vector space formed by all of the source bilingual dictionary entries (i.e., source words present in a bilingual dictionary), as well as, the vector space formed by all of the target bilingual dictionary entries.

In accordance with one aspect of the embodiments, one or more embodiments address the coverage problem described above as it applies to rarer words by bootstrapping the bilingual dictionary by iteratively augmenting it with the most probable translations found in the comparable corpora or corpus.

In accordance with another aspect of the embodiments, one or more embodiments address the polysemy/synonymy problem described above by recognizing that context vectors of bilingual dictionary entries provide some additional information with respect to synonymy and polysemy. For synonymy, for example, one or more embodiments recognize that it is likely that the synonyms $s_i$ and $s_j$ are similar while at the same time context vectors $\vec{s_i}$ and $\vec{s_j}$ are similar. For polysemy, for example, one or more embodiments recognize that if the context vectors $\overrightarrow{banque}$ and $\overrightarrow{bank}$ have few translation pairs in common, it is likely that "banque" and "bank" are used with somewhat different meanings.

In accordance with the embodiments disclosed herein, there is provided a method, apparatus and article of manufacture therefore, for identifying bilingual pairs in comparable corpora using a bilingual dictionary. The method includes: (a) using the comparable corpora to build source context vectors and target context vectors; (b) defining: (i) a source word space with the source context vectors, and (ii) a target word space with the target context vectors; (c) using the bilingual dictionary to project: (i) the source context vectors from the source word space to a source dictionary space, and (ii) the target context vectors from the target word space to a target dictionary space; (d) using the source and target context vectors from the dictionary spaces to identify source/target context vector pairs in a bilingual space; (e) computing a similarity measure for the source/target context vector pairs identified in the bilingual space to identify a bilingual pair.

In accordance with additional embodiments disclosed herein, there is provided a method, apparatus and article of manufacture therefore, for identifying bilingual pairs in comparable corpora using a bilingual dictionary. The method does not assume the dictionary space is orthogonal and includes: (a) using the comparable corpora for building for each source word v a context vector $\vec{v}$ and for each target word w a context vector $\vec{w}$; (b) computing source and target context vectors $\vec{v}'$ and $\vec{w}'$ projected into a sub-space formed by source $\vec{s}$ and target $\vec{t}$ bilingual dictionary entry context vectors (where the projected source and target context vectors $\vec{v}'$ and $\vec{v}'$ include words in the bilingual dictionary that are not present in their corresponding context vectors $\vec{v}$ and $\vec{w}$); and (c) computing a similarity measure between pairs of source words v and target words w using their context vectors $\vec{v}'$ and $\vec{v}'$ projected to a bilingual space to identify bilingual pairs.

In accordance with yet additional embodiments disclosed herein, there is provided a method, apparatus and article of manufacture therefore, for identifying using canonical correlation analysis (CCA) bilingual pairs in comparable corpora using a bilingual dictionary. The method includes: (a) building context vectors for source and target words and a number of bilingual dictionary entries using the comparable corpora; (b) computing canonical axes associated with the context vectors of bilingual pairs for defining a mapping from the comparable corpora to canonical subspaces defined by the canonical axes; (c) computing a similarity measure between source and target context vector pairs in a bilingual space defined by their canonical subspaces.

In accordance with yet further additional embodiments disclosed herein, there is provided a method, apparatus and article of manufacture therefore, for identifying using latent semantic analysis (LSA) bilingual pairs in comparable corpora using a bilingual dictionary. The method includes: (a) building context vectors for source and target words and a number of bilingual dictionary entries using the comparable corpora; (b) computing non-linear latent semantic projections of the context vectors of bilingual pairs for defining a mapping from the comparable corpora to latent semantic subspaces associated with the projections; (c) computing a similarity measure between source and target context vector pairs in a bilingual space defined by their latent semantic subspaces.

In accordance with the various embodiments, the comparable corpora generated using the embodiments described herein may be used, for example, in applications, such as, cross-language information retrieval, cross-language categorization, bilingual resource development, trans-lingual interference for resource development, and data mining tools that track and translate new terms. Advantageously, such applications would not rely solely on the use of parallel corpora which involves accepting a translation bias inherent to parallel corpora.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Definitions

The following terms have the indicated meanings throughout this application, including the claims:

A "word" or "term" is used herein to mean any combination of natural language symbols that may, for example, specify a term, word, phrase, or sentence, or any combination or portion thereof.

A "lexicon" is used herein to mean a data structure, program, object, or device that indicates words that may occur in a natural language set. A lexicon may be said to "accept" a word it indicates, and those words may thus be called "acceptable" or may be referred to as "in" or "occurring in" the lexicon. In one embodiment, a lexicon is represented using finite state automata.

A "bilingual lexicon" is used herein to mean a lexicon that indicates a translation of words: from words in a first natural language to words in a second natural language. In one embodiment, a bilingual lexicon is represented using two-tape finite state automata, where a first language is specified on a first tape and a second language is specified on a second tape of the multi-tape finite state automata (e.g., a bilingual dictionary). In alternate embodiments, multi-tape automata with three or more tapes may be used to carry additional information such as a part-of-speech tag or co-occurring bilingual lexicons.

A "measure of association" is used herein to mean a measure of strength of association of words with a word used in context (i.e., a measure of co-occurrence of words, as they may exist in a corpus of documents, with a given word).

A "context vector" for a given word is used herein to mean the measure of association of words in context with the given word. The context vector may be a weighted set of "neighbor" words that co-occur in a defined neighborhood of elements (e.g., a corpus of documents), where the weight represents some measure of the co-occurrence strength between the given word and the set of neighbor words.

B. Operating Environment for Bilingual Lexicon Extraction

Figure 1:
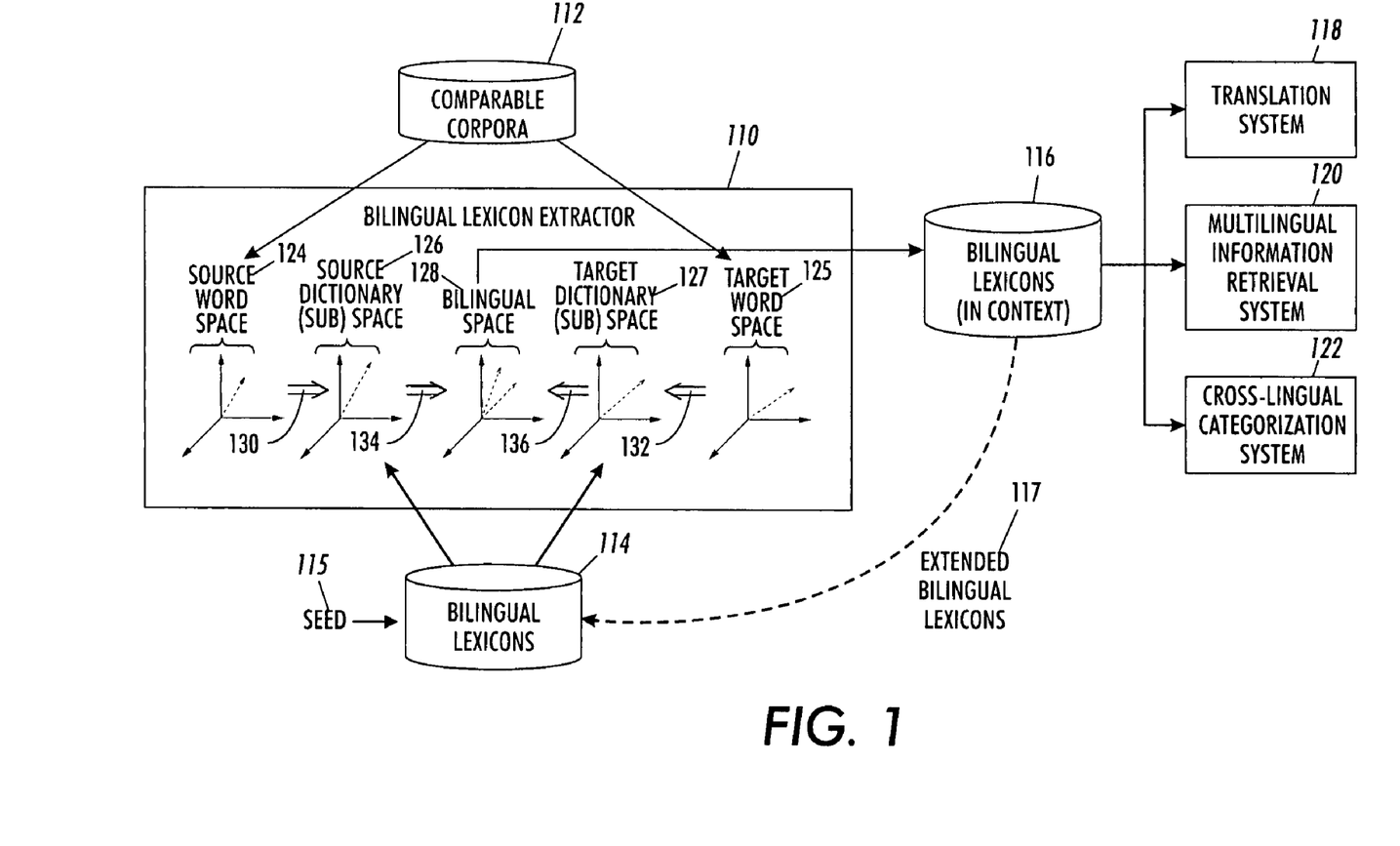
FIG. 1 illustrates the general operating environment for carrying out embodiments for extracting bilingual lexicons from comparable corpora and for use with application thereof.

FIG. 1 illustrates the general operating environment for carrying out embodiments for extracting bilingual lexicons from comparable corpora and for use with application thereof. In accordance with the various embodiments, a geometric view of bilingual lexicon extraction from comparable corpora is employed by a bilingual lexicon extractor 110 that takes as input comparable corpora or corpus 112 and a set of bilingual lexicons or bilingual dictionary 114 to produce as output (using one of the embodiments described herein) bilingual lexicons 116 (with associated context information) that are not found in the bilingual dictionary 114. The lexicons in the initial bilingual dictionary 114 may be a predefined set of translation pairs or a set of translation pairs automatically generated using seed 115.

The bilingual lexicon extractor 110 uses a geometric view to extract bilingual lexicons using the corpus 112 by developing a source word space 124 and a target word space 125, from source and target context vectors, respectively, developed from the corpus 112. The word spaces 124 and 125 are projected using projections 130 and 132 and bilingual lexicons 114, to produce source and target dictionary space (or subspace) 126 and 127, respectively. Once the subspaces 126 and 127 are aligned with projections 134 and 136 (if necessary) in bilingual subspace 128, pairs of context vectors (one source and one target) are selected and their similarity computed (e.g., using a dot-product or cosine measure).

In accordance with one aspect of the embodiments, extended (i.e., additional) bilingual lexicons 117 are added to the bilingual dictionary 114 from the bilingual lexicons identified at 116 to supplement the bilingual lexicons 114. In accordance with another aspect of the embodiments, once produced, the bilingual lexicons identified at 116 may be used with an automated translation system 118, multilingual information retrieval system 120, and cross-lingual categorization system 122, either as bilingual lexicons or bilingual lexicons with associated context information (singly or in combination with bilingual lexicons 114).

When used with the translation system 118, the bilingual lexicons may, for example, be used to enrich or tune its existing bilingual resources such as a thesaurus with domain-specific terminology. In another embodiment, the translation system 118 may be used to develop resources through translingual inference. In this embodiment for example, a corpus may be annotated in a first language with a system designed for the first language. Subsequently, the annotations may be mapped to a corpus in a second language to infer a system for the second language, based on the annotations. In such embodiments, translingual inference is enabled with the mapping of annotations which relies on aligning two corpora at the word level.

The multilingual information retrieval system 120 operates, for example, by querying in one language and retrieving results in multiple languages. In one embodiment, this is accomplished by translating query terms, where bilingual lexicons are used to search multilingual collections. The cross-lingual categorization system 122 operates, for example, by training its categorizer in one language and categorizing in multiple languages. In one embodiment, this training is accomplished using bilingual lexicons adapted to the content and/or structure of the categorizer.

Figure 2:
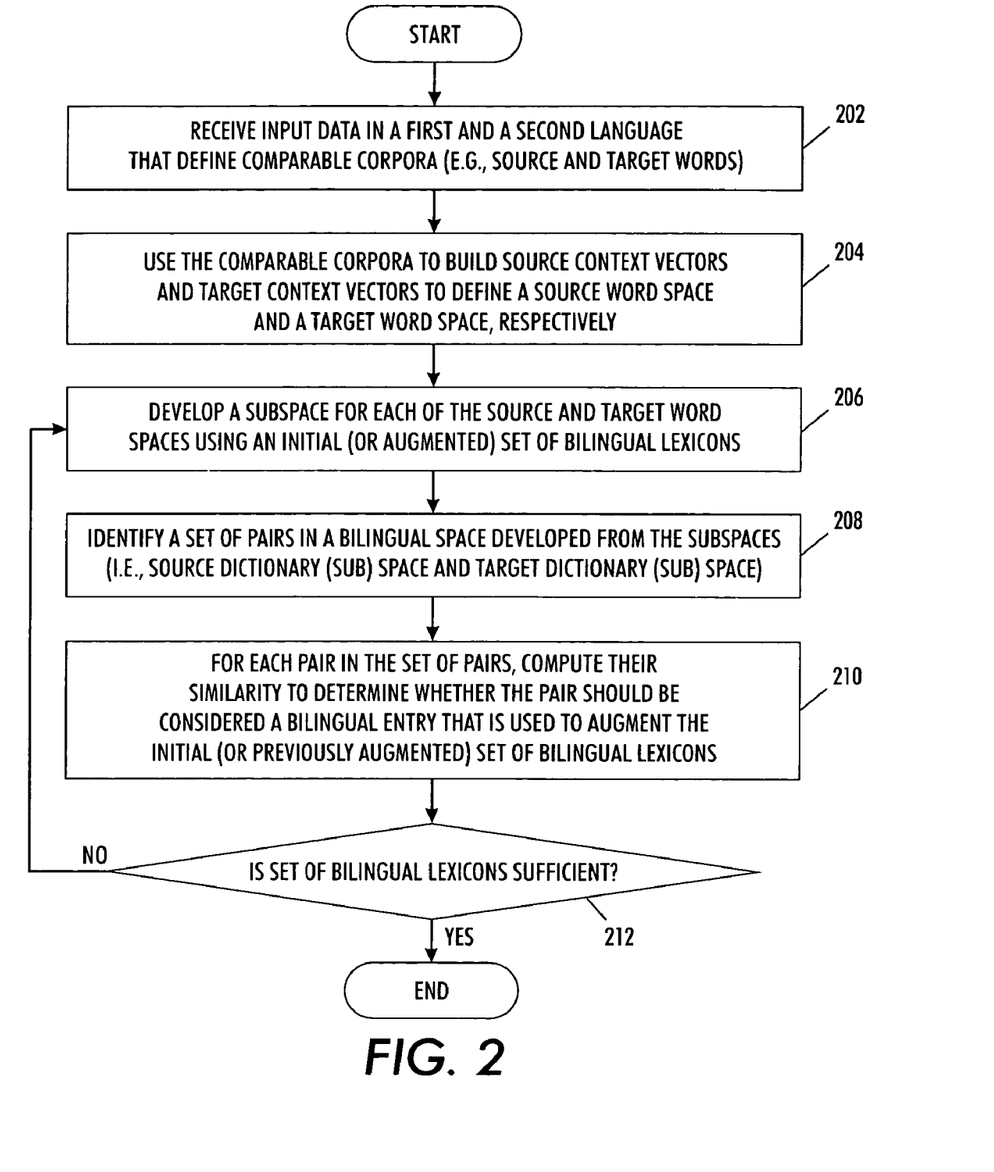
FIG. 2 shows a flow diagram of the general process performed in identifying bilingual lexicons in context from comparable corpora performed by the bilingual lexicon extractor shown in FIG. 1.

FIG. 2 shows a flow diagram of the general process performed in identifying bilingual lexicons in context from comparable corpora performed by the bilingual lexicon extractor 110 shown in FIG. 1. At 202, input data (e.g., words) is received in a source language (i.e., first language or source words) and a target language (i.e., second language or target words) that define comparable corpora (as shown at 112 in FIG. 1). At 204, the comparable corpora is used to build source context vectors and target context vectors to define a source word space 124 and a target word space 125.

At 206, subspaces 126 and 127 are developed for the source word space 124 and target word space 125 using an initial (or augmented) set of bilingual lexicons (as shown at 114 in FIG. 1). At 208, a set of pairs of context vectors is identified that form part of a bilingual space (as shown at 128 in FIG. 1). At 210, similarity measures are computed for each pair in the set of pairs to determine whether the pair should be consider a bilingual entry used for augmenting the initial (or previously augmented) set of bilingual lexicons. At 212, if the set of bilingual lexicons is sufficient, then the operation for identifying bilingual lexicons terminates; otherwise, it continues at 206 using the augmented set of bilingual lexicons in place of the initial set of bilingual lexicons (or previously augmented set of bilingual lexicons).

In addition to the action performed in FIG. 2, the following linguistic processing may be performed on either or both of the corpus and the bilingual dictionary: tokenization, lemmatization, and POS-tagging. For example, the set of pairs at 208 may include all words in the corpus or a limited number of words in the corpus. Words may be limited by, for example, their POS (e.g., nouns) identified in the corpus or their frequency of occurrence in the corpus. In one embodiment, only lexical words (e.g., nouns, verbs, adverbs, adjectives) are indexed in the corpus 112 and only single word entries in the bilingual dictionary 114 are retained. Also in this or other embodiments, infrequent words (e.g., occurring less than five times) are discarded when building indexing terms for context vectors and/or when building dictionary entries.

In accordance with the various embodiments disclosed herein, the set of pairs identified in context using the context vector space representation, at 208, is performed using different methods for computing the similarity between words in the source language and words the target language, are described in detail below in Section C, D, and E. Such methods for computing similarity may be used singly or in combination are described below in Section F.

In one embodiment, context vectors are defined by computing a mutual information association measure (e.g., using a loglikelihood test, disclosed for example by Dunning, in "Accurate Methods For The Statistics Of Surprise And Coincidence", Computational Linguistics, 19(1):64-74, 1993, which is incorporated herein by reference). The mutual information association measure may, for example, be measured between terms occurring in the same context window of a predetermined size (e.g., by considering a neighborhood of plus or minus two words around the current word) that is summed over all contexts of the corpora. It will be appreciated, however, that alternate association measures and context sizes may be used to compute context vectors.

Once the context vectors are computed, memory and computational constraints of the system may require pruning of the context vectors. For example, pruning in one embodiment involves pruning contexts vectors computed for a corpus such that, for each term, the components of a context vector after pruning represent a large percentage (e.g., ninety percent) of the total information measured (i.e., the total information in the original context vector before pruning). In another embodiment, pruning involves pruning from a context vector all but the top N ranked components that hold the most mutual information measured. In either embodiment, after pruning, the context vectors may, in addition, be normalized so that their Euclidean norm is equal to one.

C. Computing Similarity Using Context Vectors

This section describes two approaches for extracting bilingual lexicons from comparable corpora that involve computing similarity between words in a source language and a target language using a context vector of bilingual dictionary entries. Each approach is presented geometrically, the first of which makes reference to the BLEFCC References (which is referred to herein as the "Standard Approach" or "Standard Method"), and the second of which extends the Standard Approach (which is referred to herein as the "Extended Approach").

C.1 The Standard Approach

As set forth above, one assumption made in the Standard Approach is that if two words are mutual translations then their more frequent collocates are likely to be mutual translations as well. Based on this assumption, the Standard Approach builds context vectors for each source and target word, translates the target context vector using a bilingual dictionary, and compares the translation with the source context vector. Geometrically, the Standard Approach is based on the projection of context vectors onto a dictionary. This approach assumes that two terms are in translational relationship (i.e., bilingual pairs) if their context vectors projected onto the dictionary entries are translations of each other.

One embodiment for carrying out the Standard Approach may be depicted by the following set of operations: (1) using a comparable corpus, for each source word v build a context vector $\vec{v}$ consisting of the measure of association "a(v,e)" of each word "e" in the context of "v", and for each target word "w" build a context vector "$\vec{w}$" consisting of the measure of association "a(w,f)" of each word "f" in the context of "w"; (2) translate the target context vectors $\vec{w}$ with a general bilingual dictionary "$D$", while accumulating the contributions from words that yield identical translations; (3) compute the similarity between source word v and target word w using a similarity measure, such as, the Dice or Jaccard coefficients, or the Cosine measure. For more background relating to the computation of distance metrics see "Foundations of Statistical Natural Language Processing" by Manning and Schutze, MIT Press, 1999, which is incorporated herein by reference.

By observing that the dot-product contributes to measures of similarity of the Standard Method, the similarity of the Standard Method may be given by the following dot-product between source context vector $\vec{v}$ and the translation "$\overrightarrow{tr(w)}$" of the target context vector $\vec{w}$:

$$\langle \vec{v}, \overrightarrow{tr(w)} \rangle = \sum_e a(v, e) \sum_{f,(e,f) \in D} a(w, f) = \sum_{(e,f) \in D} a(v, e) a(w, f), \quad [1]$$

where because of translation step (2) of the Standard Approach above, only the word pairs (e, f) that are present in the bilingual dictionary $D$ contribute to the dot-product.

It will be appreciated by those skilled in the art that the approach presented in equation [1] (as well as other disclosed below) for computing the dot-product (or similarity measure between a source/target pair) requires some general bilingual dictionary as initial seed. One way to circumvent this requirement involves automatically building a seed lexicon based on spelling and cognate clues, as disclosed by Koehn et al., in "Learning A Translation Lexicon From Monolingual Corpora", ACL 2002 Workshop on Unsupervised Lexical Acquisition, 2002, which is hereby incorporated herein by reference.

Another approach directly addresses the problem by initially searching for a translation mapping which optimally preserves the intra-lingual association measure between words, as disclosed by Diab et al., in "A Statistical Word-level Translation Model For Comparable Corpora", Proceeding of the Conference on Content-Based Multimedia Information Access (RIAO) 2000, which is hereby incorporated herein by reference. In Diab, the underlying assumption is that pairs of words which are highly associated in one language should have translations that are highly associated in the other language.

In the approach described by Diab, the association measure is defined as the Spearman rank order correlation between their context vectors restricted to "peripheral tokens" (i.e., highly frequent words). This search method is based on a gradient decent algorithm that iteratively changes the mapping of a single word until (locally) minimizing the sum of squared differences between the association measure of all pairs of words in one language and the association measure of the pairs of translated words obtained by the current mapping.

Figure 3:
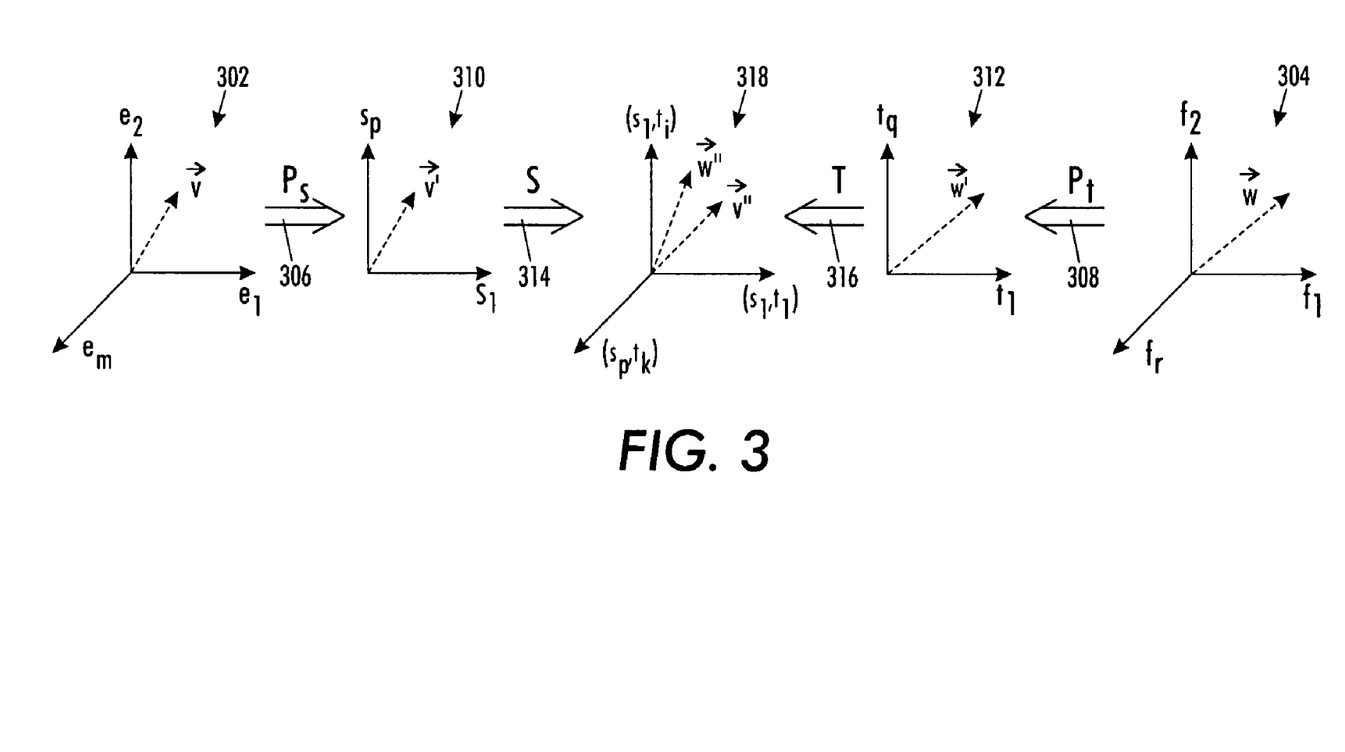
FIG. 3 illustrates a geometric approach for extracting bilingual lexicons from comparable corpora that assumes the dictionary space is orthogonal.

FIG. 3 illustrates a geometric approach for extracting bilingual lexicons from comparable corpora that assumes dictionary space is orthogonal. In the geometric presentation shown in FIG. 3, the bilingual dictionary $D$ forming part of the dot-product is denoted by a set of n translation pairs $(s_i, t_j)$ made up of source words $s_i$ (where $1 \leq i \leq p$) and target words $t_j$ (where $1 \leq j \leq q$). The set of n translation pairs $(s_i, t_j)$ may be represented as a p×q matrix M, such that $M_{ij}=1$ iff $(s_i, t_j) \in D$ (and 0 otherwise). In an alternate embodiment, the dictionary entries may be weighted as $M_{ij} \in [0,1]$. Further, in the geometric presentation shown in FIG. 3, it is assumed there are m distinct source words $(e_1, \ldots, e_m)$ and r distinct target words $(f_1, \ldots, f_r)$ in the corpus.

The association measures a(v,e) and a(w,f) may be viewed, respectively, as the coordinates of the m-dimensional context vector $\vec{v}$ in the vector space formed by the orthogonal basis $(e_1, \ldots, e_m)$ (as shown in FIG. 3 at 302), and the r-dimensional context vector $\vec{w}$ formed by the orthogonal basis $(t_1, \ldots, t_q)$ (as shown in FIG. 3 at 304). The dot-product computed using equation [1] only involves source dictionary entries of the bilingual dictionary $D$. The corresponding dimensions are selected, respectively, by an orthogonal projection on the sub-space formed by $(s_1, \ldots, s_p)$, using a p×m projection matrix $P_s$ (at 306), and by an orthogonal projection on the sub-space formed by $(t_1, \ldots, t_q)$, using a q×r projection matrix $P_t$ (at 308). It is noted that the sub-space $(s_1, \ldots, s_p)$, being a sub-family of the sub-space $(e_1, \ldots, e_m)$, is an orthogonal basis of the new sub-space (at 310), and that the sub-space $(t_1, \ldots, t_q)$, being a sub-family of the sub-space $(f_1, \ldots, f_r)$, is an orthogonal basis of the new sub-space (at 312).

As the p×q matrix M encodes the relationship between the source and target words s and t (or entries) in the bilingual dictionary $D$, equation [1] may be rewritten such that the similarity $S(v, w)$ between a source entry v and a target entry w is given by the dot-product context vector $\vec{v}$ and the translation of the context vector $\vec{w}$:

$$S_{(v,w)} = \langle \vec{v}, \overrightarrow{tr(w)} \rangle = (P_s\vec{v})^T M(P_t\vec{w}), \quad [2]$$

where "$T$" denotes transpose (here and elsewhere herein). In addition, the bilingual dictionary may be rewritten into sub-parts such that the matrix M may be rewritten as $S^T T$, with S an n×p matrix and T an n×q matrix that each encode relations between words and pairs in the bilingual dictionary (e.g., $S_{ki}=1$ iff $s_i$ is in the $k^{th}$ translation pair). Hence, the similarity $S(v, w)$ may be given by:

$$S_{(v,w)} = \vec{v}^T P_s^T S^T T P_t \vec{w} = \langle SP_s\vec{v}, TP_t\vec{w} \rangle, \quad [3]$$

which shows that the Standard Approach amounts to performing the dot-product in the vector space 318 formed by the n pairs $((s_1, t_l), \ldots, (s_p, t_k))$ (from the projection, at 314, of the matrix S on the sub-space 310 and the projection, at 316, of the matrix T on the sub-space 312). Because a given word almost never co-occurs with itself (i.e., appears as an entry in its own context vector), it is added to its own context vector, in one embodiment, with a high co-occurrence score (while in alternate embodiments other co-occurrence scoring levels may be used). The n pairs $((s_1, t_l), \ldots, (s_p, t_k))$ in the vector space 318 are assumed to be orthogonal, and correspond to translation pairs.

C.2 Extended Approach

Figure 4:
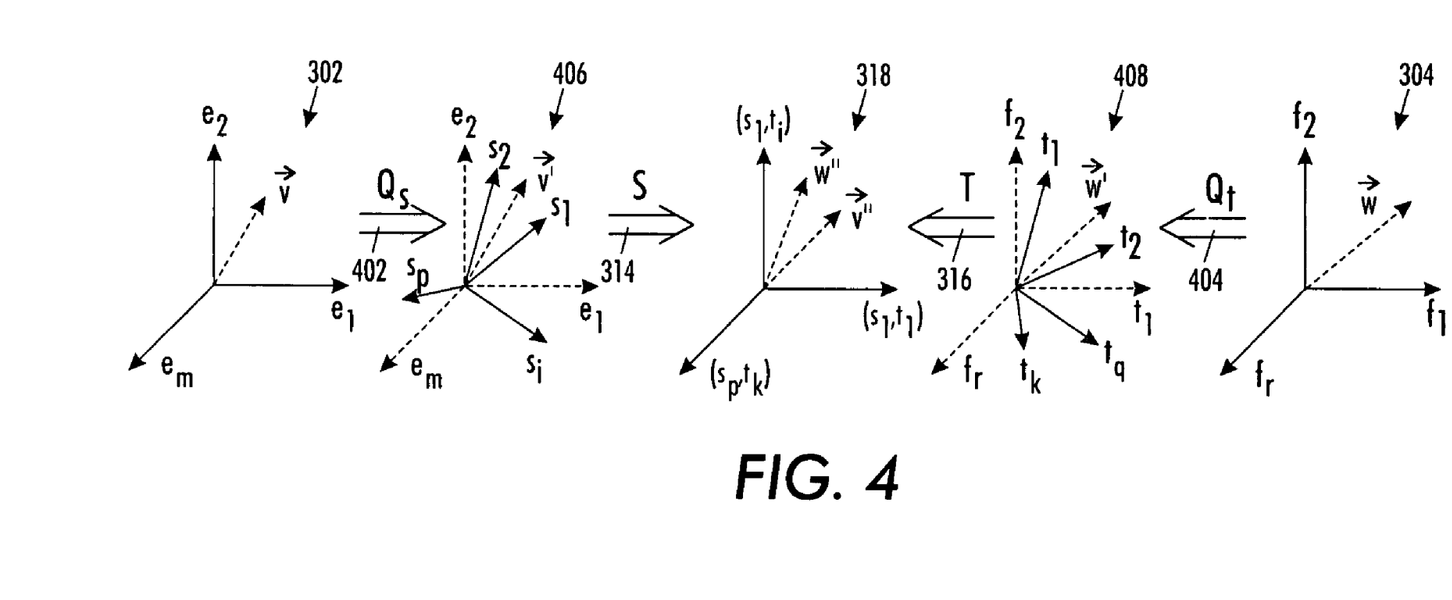
FIG. 4 illustrates a geometric approach for extracting bilingual lexicons which does not assume the dictionary space is orthogonal.

FIG. 4 illustrates a geometric approach for extracting bilingual lexicons which does not assume the dictionary space is orthogonal. Unlike the embodiment for the Standard Approach shown in FIG. 3, the embodiment for the Extended Approach shown in FIG. 4 permits all (or a selected number of) dictionary words to be used to translate a given word, whether or not they are present in the context vector of the given word. The Extended Approach makes use of the observation that synonyms may be captured through similarity of context vectors (as discussed by Grefenstette, in Section 5.3 of "Explorations in Automatic Thesaurus Discovery", Kluwer Academic Publishers, 1994, and by Lewis et al, in "Statistical Discrimination Of The Synonym/Antonym Relationship Between Words", Journal of the ACM, 1967, both of which are incorporated herein by reference).

Geometrically, the Extended Approach is based on the similarity of context vectors with dictionary entries. This approach assumes that two terms are in translational relationship (i.e., bilingual pairs) if their context vectors are similar to the context vectors of dictionary entries that are translations of each other. That is, given that synonyms may be captured through similarity of context vectors, the projections made in the Standard Approach are replaced in this embodiment with a mapping into the sub-space formed by the source and target context vectors of the dictionary entries. Accordingly, this embodiment does not assume the dictionary space 310 and 312, shown in FIG. 3 is orthogonal. By not assuming the dictionary space is orthogonal, synonyms may be accounted for by not removing words in the source word space 302 and target word space 304 that are not in the dictionary.

More specifically, instead of projecting the source context vector v on the sub-space 310 formed by $(s_1, \ldots, s_p)$ and the target context vector $\vec{w}$ on the sub-space 312 formed by $(f_1, \ldots, f_r)$ shown in Figure, this embodiment uses a p×m projection matrix $Q_s$ (at 402) to map the context vector $\vec{v}$ on the sub-space 406 generated by $(\vec{s_1}, \ldots, \vec{s_p})$, and a p×m projection matrix $Q_t$ (at 404) to map the context vector $\vec{w}$ on the sub-space 408 generated by $(\vec{t_1}, \ldots, \vec{t_q})$.

With this improved mapping given by $Q_t$ and $Q_s$, a vector space in which synonymous dictionary entries are close to each other is generated. Thus, if the target word context vector $\vec{v}$ (as defined in comparable corpus space) is close to the target dictionary entry context vectors $\vec{s_i}$ and $\vec{s_j}$ (as defined in the comparable corpus space), and $s_i$ and $s_j$ are synonyms, then the translations of both $s_i$ and $s_j$ will be used to find those words w close to v (i.e., co-occur with). Hence with this improved mapping $Q_t$ and $Q_s$, the similarity $S(v, w)$ may be given in this embodiment by:

$$S_{(v,w)} = \langle SQ_s\vec{v}, TQ_t\vec{w} \rangle = \vec{v}^T Q_s^T S^T T Q_t \vec{w}, \quad [4]$$

where, in one embodiment, the mapping $Q_s$ is given by the following m×p matrix:

$$Q_s = R_s^T = (\vec{s_1} \ldots \vec{s_p}) = \begin{pmatrix} a(s_1, e_1) & \ldots & a(s_p, e_1) \\ \vdots & \vdots & \vdots \\ a(s_1, e_m) & \ldots & a(s_p, e_m) \end{pmatrix},$$

and the mapping $Q_t$ is given by the following r×q matrix:

$$Q_t = R_t^T = (\vec{t_1} \ldots \vec{t_q}) = \begin{pmatrix} a(t_1, f_1) & \ldots & a(t_q, f_1) \\ \vdots & \vdots & \vdots \\ a(t_1, f_r) & \ldots & a(t_q, f_r) \end{pmatrix},$$

where $e_i$ is a source entry and $f_j$ is a target entry in the bilingual dictionary $D$ and $s_i$ is a source word and $t_j$ is a target word in the comparable corpora.

In this embodiment, noise may result from spurious relationships introduced when dictionary words not present in the context vector of a given word are used to translate the given word since most bilingual dictionary entries may be represented in the resulting source $\vec{v}'$ and target $\vec{w}'$ context vectors after projecting the source $\vec{v}$ and target $\vec{w}$ context vectors with $Q_s$ at 402 and $Q_t$ at 404, respectively. One embodiment accounts for the possibility of such noise being introduced by restricting (i.e., pruning) the number of translation pairs in the bilingual dictionary to only those N dictionary entries (e.g., N=200) closest to the source $\vec{v}$ and target $\vec{w}$ context vectors (i.e., based on the measure of similarity between the source $\vec{v}$ and target $\vec{w}$ context vectors and each source $\vec{s}$ and target $\vec{t}$ bilingual dictionary entry context vectors). Such pruning permits spurious relationships to be discarded by selecting only those translation pairs that are in true relation with the word to be translated.

C.3 Alternate Embodiments To Extended Approach

In alternate embodiments, the mapping $Q_s$ and $Q_t$ given at 402 and 404, respectively, may be given by the pseudo-inverse of $R_s$ and $R_t$. It will be appreciated by those skilled in the art, however, that computing the pseudo-inverse of $R_s$ and $R_t$ is a complex operation, while the preceding embodiment is a less complex operation because the columns of the Q matrices correspond to the context vectors of the bilingual dictionary $D$. As set forth below, this method generalizes over the probabilistic approach presented by Dejean et al., in "An Approach Based On Multilingual Thesauri And Model Combination For Bilingual Lexicon Extraction", International Conference On Computational Linguistics, COLING, 2002, which is incorporated herein by reference (hereinafter referred to as the "Dejean Reference").

More specifically, as set forth in Section C.2 above, $SQ_s \vec{v}$, is an n-dimensional vector, defined over $((s_1, t_l), \ldots, (s_p, t_k))$. The coordinate of $SQ_s \vec{v}$ on the axis corresponding to the translation pair $(s_i, t_j)$ is $\langle \vec{s_i}, \vec{v} \rangle$, and the coordinate of $TQ_t \vec{w}$ on the same axis is $\langle \vec{t_j}, \vec{w} \rangle$. Thus, the similarity $S(v, w)$ given by equation [4] above can be rewritten as:

$$S(v, w) = \sum_{(s_i, t_j)} \langle \vec{s_i}, \vec{v} \rangle \langle \vec{t_j}, \vec{w} \rangle,$$

which can be normalized in order to acquire a probability distribution leading to similarity $S(v, w)$ given by:

$$S(v, w) = \sum_{(s_i, t_j)} P(v) P(s_i \mid v) P(w \mid t_j) P(t_j).$$

By imposing probability $P(t_j)$ to be uniform, and by denoting C to be a translation pair, similarity $S(v, w)$ may be defined as:

$$S(v, w) \propto \sum_C P(v) P(C \mid v) P(w \mid C),$$

with the interpretation that only the source word and the target word in C are relevant for probabilities $P(C|v)$ and $P(w|C)$, respectively. To identify those words w closest to a given word v, similarity $S(v, w)$ may be defined as:

$$S(w \mid v) \propto \sum_C P(C \mid v) P(w \mid C),$$

which is similar to the probabilistic model adopted in the Dejean Reference. It will be appreciated by those skilled in the art that this probabilistic model is a special case of the Extended Approach set forth in Section C.2 above.

D. Computing Similarity Using Canonical Correlation Analysis

In this embodiment, two terms are considered to have a translation relationship if their context vectors projected in a space of language-independent latent semantics are similar to each other. This language-independent latent semantics space and the associated projections from the source and target languages are determined by Canonical Correlation Analysis (CCA). CCA simultaneously offers the benefits of dimension reduction (e.g., to cope with synonymy issues) and the automatic extraction of axes of maximal correlation between the two languages, which can be considered as the manifestations of the same phenomenon (semantics).

Figure 5:
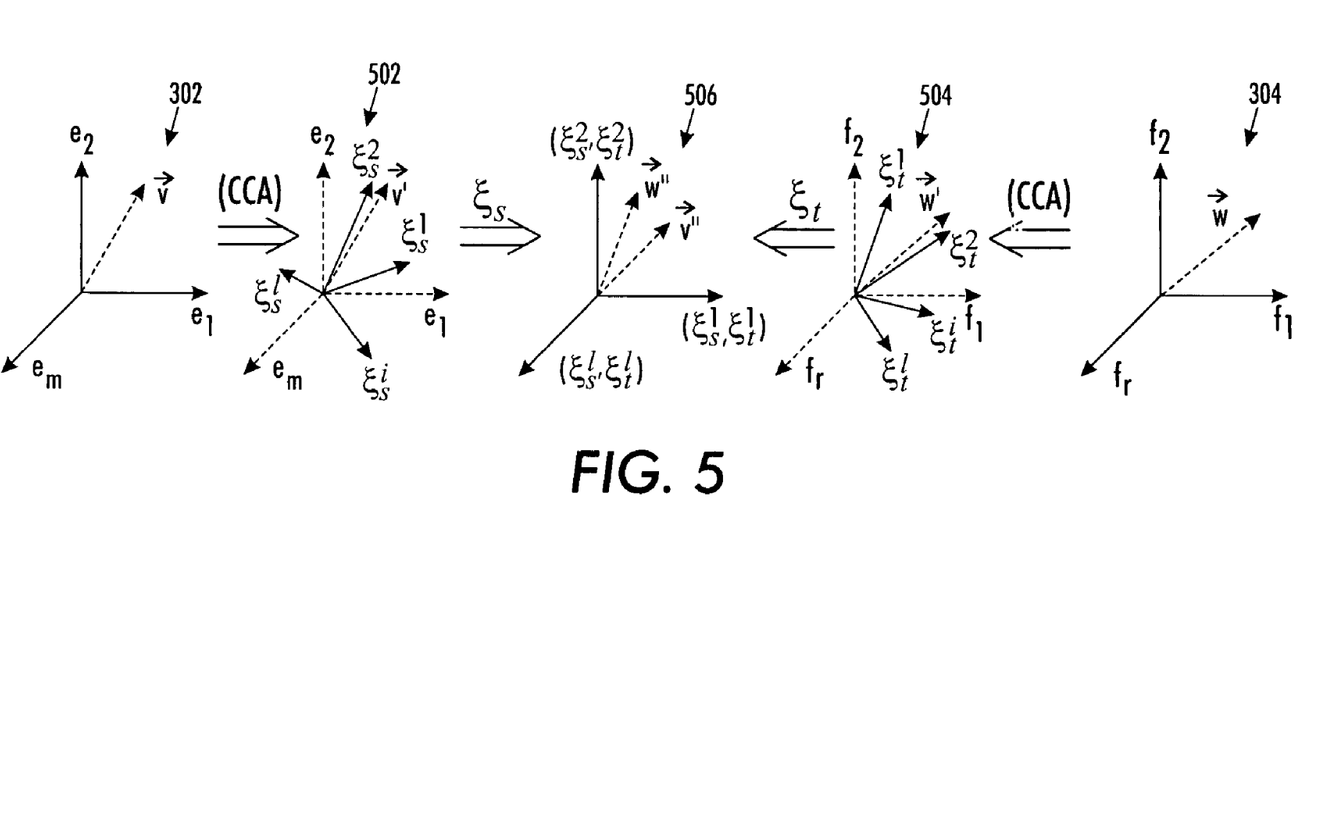
FIG. 5 illustrates a geometric approach for extracting bilingual lexicons from comparable corpora using Canonical Correlation Analysis (CCA)

FIG. 5 illustrates a geometric approach for extracting bilingual lexicons from comparable corpora using Canonical Correlation Analysis (CCA). Graphically, the intensity (i.e., similarity) of the relationship between the term $v_i$ (in the source language) and the term $w_j$ (in the target language) is determined by projecting the source/target word spaces 302/304 onto the dictionary spaces 502/504, respectively, using CCA. This approach assumes that two terms are in translational relationship (i.e., bilingual pairs) if their context vectors projected in a space of language-independent latent semantics, which is determined using CCA, are similar to each other.

One embodiment for carrying out this approach may be depicted by the following set of operations: (a) building context vectors for source and target words and all (or a defined number of) bilingual dictionary entries using the comparable corpora (this permits dictionary entries to be accounted even if they are not present in source/target context vectors); (b) computing canonical axes associated with the context vectors of the source and target words for adapting the mapping 302/304 defined by the bilingual dictionary to the comparable corpora in their canonical subspaces 502/504; (c) computing similarity in the bilingual space 506 between source and target word pairs.

Formally in this embodiment, the similarity $S(v, w)$ between the source and target context vectors $\vec{v}$ and $\vec{w}$, which forms the basis of the bilingual lexicon extracted by this third embodiment, may be given by:

$$S(v,w) = \langle \Xi_s \vec{v}, \Xi_t \vec{w} \rangle = \vec{v}^T \Xi_s^T \Xi_t \vec{w}, \quad [5]$$

where $\Xi_s = [\xi_s^1, \ldots, \xi_s^l]^T$ and $\Xi_t = [\xi_t^1, \ldots, \xi_t^l]^T$, and where the $\xi_s$ and $\xi_t$ denote the directions in the source and target vector spaces (defined by orthogonal basis $(e_1, \ldots, e_m)$ and $(f_1, \ldots f_r)$) such that the correlation of the projections of the translation pairs on these directions is maximized.

To derive $\Xi_s$ and $\Xi_t$, the general bilingual dictionary $D$ is used to "pair" observations, where each observation is the source and target context vectors $\vec{v}$ and $\vec{w}$. If the source entry has more than one translation, there are as many observations for this entry as the number of its translations in the general bilingual dictionary $D$. Similar to other embodiments, the general bilingual dictionary $D$ may be either binary or a weight matrix.

Given the observations (the source and target context vectors $\vec{v}$ and $\vec{w}$) and the vectors $\xi_s$ and $\xi_t$, the following matrix $C$ may be defined:

$$C = \begin{bmatrix} e_1 \ldots e_m & f_1 \ldots f_r \\ \cdots \cdots \cdots & \cdots \cdots \cdots \\ \vdots \ \vdots \ \vdots & \vdots \ \vdots \ \vdots \\ \cdots \cdots \cdots & \cdots \cdots \cdots \end{bmatrix} \begin{matrix} (s^{(1)}, t^{(1)}) \\ \vdots \\ (s^{(n)}, t^{(n)}) \end{matrix}$$

The size of this matrix $C$ is n×(m+r), where the rows of the matrix correspond to translation pairs $(s_i, t_j)$, where the notation $(s^{(k)}, t^{(k)})$ is a renumbering of $(s_i, t_j)$, and the columns of the matrix correspond to source and target vocabularies $(e_1, \ldots, e_m)$ and $(f_1, \ldots, f_r)$ in the comparable corpora, respectively. In an alternate embodiment, the observations defined by the source and target context vectors $\vec{v}$ and $\vec{v}$ are restricted to the terms in the bilingual dictionary $D$ by simple projection.

The matrix $C$ shows that each translation pair supports two views, provided by the context vectors in the source and target languages. Each view is connected to the other by the translation pair it represents. The statistical technique of Canonical Correlation Analysis can be used to identify directions $\xi_s$ and $\xi_t$ in the source view (first m columns of matrix $C$) and target view (last r columns of matrix $C$) that are maximally correlated (i.e., behave the same way with respect to the translation pairs), respectively. Intuitively, the directions in the source and target vector spaces $\xi_s$ and $\xi_t$ define latent semantic axes that capture the implicit relations between translation pairs, and induce a natural mapping across languages, which may be formulated as the maxima given by:

$$\rho = \max_{\xi_s, \xi_t} \frac{\sum_i \langle \xi_s, \vec{s}^{(i)} \rangle \langle \xi_t, \vec{t}^{(i)} \rangle}{\sqrt{\sum_i \langle \xi_s, \vec{s}^{(i)} \rangle^2 \sum_i \langle \xi_t, \vec{t}^{(i)} \rangle^2}}.$$

As in principal component analysis, once the first two directions $(\xi_s^1, \xi_t^1)$ have been identified, the process can be repeated in the sub-space orthogonal to the one formed by the directions already identified. However, a general solution based on a set of eigenvalues is possible, where weighted combinations of terms designated by the m-dimensional vector $\xi_s$ in the source language and the r-dimensional vector $\xi_t$ in the target language are identified such that the projections defined by the vectors $\xi_s$ and $\xi_t$ maximize the correlation within the observations (i.e., the source and target context vectors $\vec{v}$ and $\vec{w}$).

The general solution based on eigenvalues can be formulated as the following generalized eigenvalue problem:

$$B\xi = \rho D\xi, \quad [6]$$

where $$B = \begin{pmatrix} 0 & R_t R_t^T R_s R_s^T \\ R_s R_s^T R_t R_t^T & 0 \end{pmatrix},$$

$$D = \begin{pmatrix} (R_s R_s^T)^2 & 0 \\ 0 & (R_t R_t^T)^2 \end{pmatrix},$$

$$\xi = \begin{pmatrix} \xi_s \\ \xi_t \end{pmatrix}, \text{ and}$$

$R_s$ and $R_t$ denote the first m and last r, respectively, columns of the matrix $C$.

The standard approach to solve the eigenvalue problem defined by equation [6] above is to perform an incomplete Cholesky decomposition of a regularized form of D, as disclosed by Bach et al., in "Kernel Independent Component Analysis", Journal of Machine Learning, 2001, which is incorporated herein by reference. Using incomplete Cholesky decomposition of a regularized form of D to solve the eigenvalue problem defined by equation [6], yields pairs of source and target directions $(\xi_s^1, \xi_t^1), \ldots, (\xi_s^l, \xi_t^l)$ that define a new bilingual subspace 506 (where the source and target context vectors $\vec{v}''$ and $\vec{w}''$ are linear projections of $\vec{v}$ and $\vec{w}$, respectively), shown in FIG. 5, in which to project words from each language. This subspace 506 serves the same role as the subspace 318, shown in FIGS. 3 and 4, defined by translation pairs $(s_p, t_q)$ in the embodiments in Section C, although with CCA, it is derived from the corpus via context vectors of the translation pairs. Once projected, words from different languages can be compared, using for example, their dot-product or cosine measures.

It will be appreciated by those skilled in the art that the number l of vectors retained in $\Xi_s = [\xi_s^1, \ldots \xi_s^l]^T$ and $\Xi_t = [\xi_t^1, \ldots \xi_t^l]^T$ of each language directly defines the dimensions of the bilingual subspace 506 used for comparing words across language. In one embodiment, the number of dimensions that are used in the computation is empirically optimized (e.g., l=300). Further, those skilled in the art will appreciate that CCA and its kernelised version (used by Vinokourov et al., in "Finding Language-Independent Semantic Representations of Text Using Kernel Canonical Correlation Analysis", Advances in Neural Information Processing Systems 12, 2002, which is incorporated herein by reference, as a way to build a cross-language information retrieval system from parallel corpora) may be used to infer language-independent semantic representations from comparable corpora, which induce a similarity between words in the source and target languages.

E. Computing Similarity Using PLSA

Figure 6:
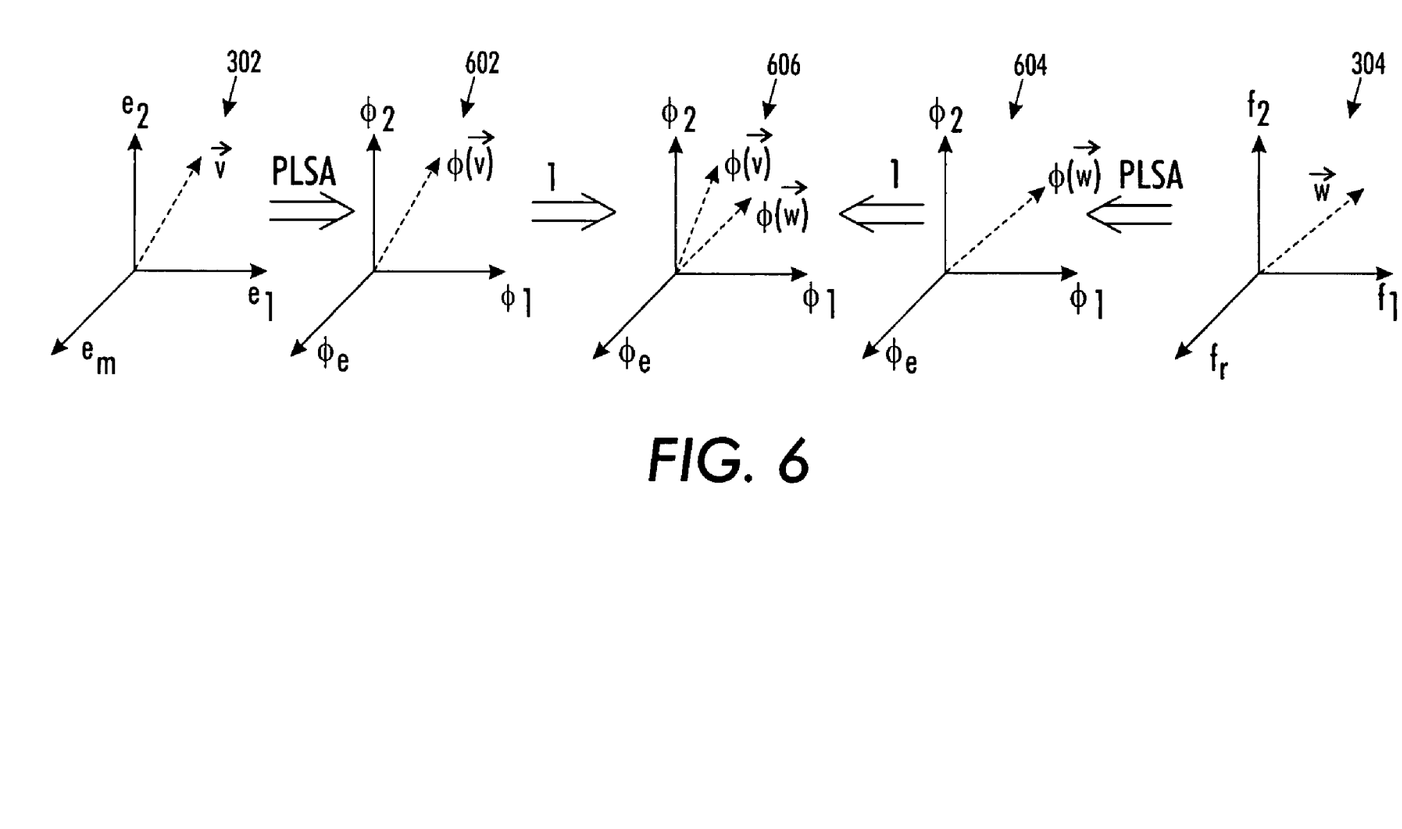
FIG. 6 illustrates a geometric approach for extracting bilingual lexicons from comparable corpora using Probabilistic Latent Semantic Analysis (PLSA).

FIG. 6 illustrates a geometric approach for extracting bilingual lexicons from comparable corpora using Probabilistic Latent Semantic Analysis (PLSA). In one implementation of this embodiment, raw co-occurrence counts are used as association measures. Graphically, the intensity (i.e., similarity) of the relationship between the term $v_i$ (in the source language) and the term $w_j$ (in the target language) is determined by projecting the source/target word spaces 302/304 onto the dictionary spaces 602/604 using PLSA. The dictionary spaces 602/604 map 1:1 with bilingual space 606 such that source and target context vectors $\phi(\vec{v})$ and $\phi(\vec{w})$ in the bilingual space 606 are non-linear projections of $\vec{v}$ and $\vec{w}$ from vector spaces 302 and 304, respectively.

In this embodiment, the matrix $C$ (defined in section D above) is arranged such that synonyms of translation pairs appear in similar clusters while polysemous words of translation pairs appear in different clusters. Similar to the other embodiments, two terms are considered to have a translation relationship if their context vectors projected in a common space are similar to each other. However, in this embodiment PLSA is used to identify structure in the matrix C in order to facilitate the identification of translation relationships. More background on PLSA is disclosed by Hofmann, in "Probabilistic Latent Semantic Analysis", Proceedings of the Fifteenth Conference on Uncertainty in Artificial Intelligence, pages 289-296, 1999, and Deerwester et al., in "Indexing By Latent Semantic Analysis", Journal of the American Society for Information Science, 41 (6):391-407, 1990, which are both incorporated herein by reference.

More specifically in this embodiment, the matrix $C$ encodes in each row k the context vectors of the source (first m columns) and the target (last r columns) of each translation pair. In accordance with this embodiment, the content of the matrix $C$ is clustered using PLSA so that translation pairs with synonymous words appear in the same cluster, while translation pairs with polysemous words appear in different clusters (i.e., soft clustering). Further, it is desirable that the clustering of the content of the matrix $\mathcal{C}$ behaves symmetrically with respect to translation pairs and vocabulary words because of the symmetry between the roles played by translation pairs and vocabulary words.

Assuming the matrix $\mathcal{C}$ encodes the co-occurrences between vocabulary words x and translation pairs d, the measure of association $a(s_i, e_j)$, in this embodiment, is the frequency of occurrence (or number of occurrences) of ej in the context of $s_i$ and $f_j$ in the context of $t_i$. In one implementation of this embodiment, PLSA may be used to model the probability of co-occurrence x and d via latent classes α using:

$$P(x, d) = \sum_\alpha P(\alpha)P(x|\alpha)P(d|\alpha),$$

where, for a given class, words and translation pairs are assumed to be independently generated from class-conditional probabilities P(x|α) and P(d|α). Note that the latter probability distribution is language-independent, and that the same latent classes are used for the two languages. The parameters of the model are obtained by maximizing the likelihood of the observed data (matrix $\mathcal{C}$) through Expectation-Maximization, which is disclosed by Dempster et al., "Maximum Likelihood From Incomplete Data Via The EM Algorithm", Journal of the Royal Statistical Society, Series B, 39(1):1-38, 1977, which is incorporated herein by reference.

In addition, in order to reduce the sensitivity to initial conditions, a deterministic annealing scheme is used as disclosed by Ueda et al., in "Deterministic Annealing Variant Of The EM Algorithm", Advances in Neural Information Processing System 7, pages 545-552, 1995, which is incorporated herein by reference. The deterministic annealing EM algorithm disclosed by Hofmann for PLSA cited above leads to the following equations for iteration t and deterministic annealing parameter β:

$$P(\alpha|x, d) = \frac{P(\alpha)^\beta P(x|\alpha)^\beta P(d|\alpha)^\beta}{\sum_\alpha P(\alpha)^\beta P(x|\alpha)^\beta P(d|\alpha)^\beta}, \quad [7]$$

$$P^{(t+1)}(\alpha) = \frac{1}{\sum_{(x,d)} n(x, d)} \sum n(x, d) P(\alpha|x, d), \quad [8]$$

$$P^{(t+1)}(x|\alpha) = \frac{\sum_d n(x, d) P(\alpha|x, d)}{\sum_{(x,d)} n(x, d) P(\alpha|x, d)}, \quad [9]$$

$$P^{(t+1)}(d|\alpha) = \frac{\sum_x n(x, d) P(\alpha|x, d)}{\sum_{(x,d)} n(x, d) P(\alpha|x, d)}, \quad [10]$$

where n(x,d) is the number of co-occurrences between vocabulary words x and translation pairs d. Parameters α, w, d are obtained by iterating equations [7]-[10] for each β, 0<β≦1.

While this method of clustering the content of the matrix $\mathcal{C}$ using PLSA may identify relevant bilingual semantic classes, it does not directly define a similarity between words across languages. The similarity between words across languages (i.e., associated similarities) may be defined using Fisher kernels, as disclosed by Jaakkola et al., in "Exploiting Generative Models In Discriminative Classifiers", Advances in Neural Information Processing Systems 11, pages 487-493, 1999, which is incorporated herein by reference.

Fisher kernels may be used to derive a similarity measure from a probabilistic model, and are useful whenever a direct similarity between observed features is hard to define or insufficiently defined. In one embodiment, denoting l(x)=lnP (x|θ) the log-likelihood of vocabulary words x the similarity $\mathcal{S}(v, w)$ may be defined using the Fisher kernel as:

$$\mathcal{S}(v,w) = K(v,w) = \nabla l(v)^T I_F^{-1} \nabla l(w),$$

where the Fisher information matrix $I_F = E(\nabla l(x) \nabla l(y)^T)$ keeps the kernel independent of reparameterization, and where x and y are any vocabulary word from source and target vocabularies $(e_1, \ldots, e_m)$ and $(f_1, \ldots, f_r)$, respectively. It is assumed with a suitable parameterization that $I_F \approx 1$. Using PLSA as disclosed by Hofmann, in "Learning The Similarity Of Documents: An Information-Geometric Approach To Document Retrieval And Categorization", Advances in Neural Information Processing Systems 12, page 914, MIT Press, 2000, which is incorporated herein by reference, the Fisher kernel between two words v and w becomes:

$$K(v, w) = \sum_\alpha \frac{P(\alpha|v)P(\alpha|w)}{P(\alpha)} + \sum_d \hat{P}(d|v)\hat{P}(d|w) \sum_\alpha \frac{P(\alpha|d, v)P(\alpha|d, w)}{P(d|\alpha)},$$

where d ranges over the translation pairs. The Fisher kernel performs the dot-product in a vector space defined by the parameters of the model. With only one class, the expression of the Fisher kernel reduces to:

$$K(v, w) = 1 + \sum_d \frac{\hat{P}(d|v)\hat{P}(d|w)}{P(d)}.$$

Those skilled in the art will appreciate that apart from the additional intercept ("1"), this computation of similarity $\mathcal{S}(v, w)$ may be defined similar to the similarity provided by the Standard Approach set forth in Section B.1 above, with associations given by scaled empirical frequencies $a(x,d) = \hat{P}(d|x)/\sqrt{P(d)}$ for vocabulary words x and translation pairs d. Accordingly, the Standard Approach and the Fisher kernel with one class would be expected to have similar behavior. In addition to the Fisher kernel set forth above, two alternate versions may be obtained through normalization (NFK) and exponentiation (EFK), respectively, as:

$$NFK(v, w) = \frac{K(v, w)}{\sqrt{K(v, v)K(w, w)}}, \text{ and}$$

$$EFK(v, w) = e^{-\frac{1}{2}(K(v,v) + K(w,w) - 2K(v,w))}.$$

F. Combination Of Methods

In another embodiment, methods for computing similarity $\mathcal{S}(v, w)$ described above are combined to compute an overall similarity value to improve the average precision of the various bilingual lexicon extraction methods. Various methods for combining similarity computations may be used. For example, an overall similarity score may be computed using a percentage of each score. The percentage attributed to each computed similarity score in the overall score need not be equal but may instead be fixed or vary depending on, for example, performance data.

In combining similarity computation methods, the overall similarity score may be computed over a series of stages, where each stage is computed using a different similarity measure. For instance, the first stage may compute a first set of similarities and the second stage may compute a second set of similarities using the highest results of the first stage, where the final result is the highest similarities of the second stage. That is, values of similarity that are candidate bilingual lexicons from the first stage may be re-ranked during one or more additional stages using alternate similarity measures. In yet another example, such a combination of methods involves combining Fisher kernels with different latent classes in a first stage, and a combination of the different methods in a second stage.

G. Miscellaneous

Additional background concerning the embodiments described herein is published by Gaussier et al., in "A Geometric View On Bilingual Lexicon Extraction From Comparable Corpora", published in 42nd Annual Meeting of the Association for Computational Linguistics (ACL) Jul. 21-26, 2004 Barcelona, Spain, which is incorporated herein by reference.

Those skilled in the art will recognize that a general purpose computer may be used for implementing the operating environment shown in FIG. 1. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for identifying bilingual pairs in comparable corpora using a bilingual dictionary, the method comprising:
   (a) using the comparable corpora to build source context vectors and target context vectors;
   (b) defining: (i) a source word space with the source context vectors, and (ii) a target word space with the target context vectors;
   (c) using the bilingual dictionary to project: (i) the source context vectors from the source word space to a source dictionary space, and (ii) the target context vectors from the target word space to a target dictionary space;
   (d) using the source and target context vectors from the dictionary spaces to identify source/target context vector pairs in a bilingual space;
   (e) computing a similarity measure for the source/target context vector pairs identified in the bilingual space to identify a one or more bilingual pairs; and
   (f) adding the identified one or more bilingual pairs as entries in the bilingual dictionary;
   wherein the steps (a), (b), (c), (d), (e), and (f) are each performed by a processor.

2. The method according to claim 1, further comprising:
pruning components from the context vectors; and
normalizing the pruned context vectors.

3. The method according to claim 1, further comprising:
building context vectors using entries in the bilingual dictionary; and
projecting at (c): (i) the source context vectors and the dictionary entry context vectors from the source word space to a source dictionary space, and (ii) the target context vectors and the dictionary entry context vectors from the target word space to a target dictionary space.

4. The method according to claim 1, further comprising:
using the bilingual dictionary with the added one or more bilingual pairs to perform one or more of cross-language information retrieval, and cross-language categorization.

5. The method according to claim 4, further comprising repeating (c)-(d) when the bilingual dictionary incorporates the bilingual pairs identified at (e).

6. The method according to claim 1, wherein each context vector provides a measure of association between a selected word in the comparable corpora and other words in the comparable corpora.

7. The method according to claim 6, where the context vector of a given word includes a set of words that co-occur in a neighborhood of the given word in the comparable corpora.

8. The method according to claim 6, wherein the context vector of a given word includes a frequency of co-occurrence for each of a set of words in a neighborhood of the given word in the comparable corpora.

9. The method according to claim 1, wherein (b)-(e) comprises computing similarity measure:

$$S(v,w) = \langle \vec{v}, \overrightarrow{tr(w)} \rangle = (P_s \vec{v})^T M (P_t \vec{w}), \text{ where}$$

$\vec{v}$ is a source context vector;

$\vec{w}$ is a target context vector;

$P_s$ is a source projection matrix;

$P_t$ is a target projection matrix;

M is a matrix that encodes the relationship between the source and target words s and t in the bilingual dictionary; and $\overrightarrow{tr(w)}$ is the translation of the target context vector $\vec{w}$.

10. The method according to claim 9, wherein the matrix M is defined as $S^T T$, with S and T being source and target matrices that each encode relations between words and translation pairs in the bilingual dictionary (where "$T$" denotes transpose).

11. The method according to claim 1, wherein (b)-(e) comprises computing similarity measure S(v, w) using the following equation:

$$S(v,w) = \langle SQ_s \vec{v}, TQ_t \vec{w} \rangle = \vec{v}^T Q_s^T S^T T Q_t \vec{w}, \text{ where}$$

$\vec{v}$ is a source context vector;

$\vec{w}$ is a target context vector;

$Q_s$ is a projection matrix for mapping the source context vector $\vec{v}$ on a sub-space generated by $(\vec{s_1}, \ldots, \vec{s_p})$;

$Q_t$ is a projection matrix for mapping the target context vector $\vec{w}$ on a sub-space generated by $(\vec{t_1}, \ldots, \vec{t_q})$;

S is a matrix that encodes relations between source words and pairs in the bilingual dictionary;

T is a matrix that encodes relations between target words and pairs in the bilingual dictionary.

12. The method according to claim 11, further comprising pruning translation pairs from resulting projections of context vectors $\vec{v}$ and $\vec{w}$ using matrices $Q_s$ and $Q_t$, respectively.

13. The method according to claim 1, wherein (c)-(e) comprises computing similarity measure S(v,w) using the following equation:

$$S(v,w) = \langle \Xi_s \vec{v}, \Xi_t \vec{w} \rangle = \vec{v}^T \Xi_s^T \Xi_t \vec{w}, \text{ where}$$

$\Xi_s = [\xi_s^1, \ldots, \xi_s^l]^T$ and $\Xi_t = [\xi_t^1, \ldots, \xi_t^l]^T$, and $\xi_s$ and $\xi_t$ denote directions in the source and target vector spaces.

14. The method according to claim 13, wherein $\xi_s$ and $\xi_t$ are obtained using canonical correlation analysis.

15. The method according to claim 1, wherein (c)-(e) comprises computing similarity measure S(v,w) using the following equation:

$$S(v,w) = K(v,w) = \nabla l(v)^T I_F^{-1} \nabla l(w), \text{ where}$$

$l(x) = \ln P(x|\theta)$ the log-likelihood of vocabulary words x, and $I_F = E(\nabla l(x) \nabla l(y)^T)$ denotes the Fisher information matrix where x and y are any vocabulary word from source and target vocabularies $(e_1, \ldots, e_m)$ and $(f_1, \ldots, f_r)$ respectively.

16. The method according to claim 15, wherein $I_F = E(\nabla l(x) \nabla l(y)^T) \approx 1$.

17. The method according to claim 1, wherein (c)-(e) comprises computing a plurality of similarity measures to produce an overall similarity measure.

18. The method according to claim 1, wherein the bilingual dictionary is initialized with a set of translation pairs automatically generated using seed.

19. An article of manufacture comprising a memory device storing computer-readable program code which when executed by a processor identifies bilingual pairs in comparable corpora using a bilingual dictionary using a method comprising:

(a) using the comparable corpora for building for each source word v a context vector $\vec{v}$ and for each target word w a context vector $\vec{w}$;

(b) computing source and target context vectors $\vec{v}'$ and $\vec{w}'$ projected into a sub-space formed by source $\vec{s}$ and target $\vec{t}$ bilingual dictionary entry context vectors; and (c) computing a similarity measure between pairs of source words v and target words w using their context vectors $\vec{v}'$ and $\vec{w}'$ projected to a bilingual space to identify bilingual pairs.

20. The article of manufacture according to claim 19, wherein (i) the context vector $\vec{v}$ comprises a measure of association a(v,e) for each word e in the context of v, and (ii) the context vector $\vec{w}$ comprises a measure of association a(w,f) for each word f in the context of w.

21. The article of manufacture according to claim 19, further comprising repeating (b) when the bilingual dictionary incorporates the bilingual pairs identified at (c).

22. The article of manufacture according to claim 19, further comprising pruning translation pairs from context vectors $\vec{v}'$ and $\vec{w}'$ based on a measure of similarity between source $\vec{v}$ and target $\vec{w}$ context vectors and source $\vec{s}$ and target $\vec{t}$ bilingual dictionary entry context vectors.

23. An article of manufacture comprising a memory device storing computer-readable program code which when executed by a processor identifies bilingual pairs in comparable corpora using a bilingual dictionary using a method comprising:

(a) using the comparable corpora to build source context vectors and target context vectors;

(b) defining: (i) a source word space with the source context vectors, and (ii) a target word space with the target context vectors;

(c) using the bilingual dictionary to project: (i) the source context vectors from the source word space to a source dictionary space, and (ii) the target context vectors from the target word space to a target dictionary space;

(d) using the source and target context vectors from the dictionary spaces to identify source/target context vector pairs in a bilingual space;

(e) computing a similarity measure for the source/target context vector pairs identified in the bilingual space to identify a bilingual pair.

24. A method for identifying bilingual pairs in comparable corpora using a bilingual dictionary, the method comprising:

(a) using the comparable corpora for building for each source word v a context vector $\vec{v}$ and for each target word w a context vector $\vec{w}$;

(b) computing source and target context vectors $\vec{v}'$ and $\vec{w}'$ projected into a sub-space formed by source $\vec{s}$ and target $\vec{t}$ bilingual dictionary entry context vectors;

(c) computing a similarity measure between pairs of source words v and target words w using their context vectors $\vec{v}'$ and $\vec{w}'$ projected to a bilingual space to identify bilingual pairs; and (d) adding the identified bilingual pairs as entries in the bilingual dictionary;

wherein the steps (a), (b), (c), and (d) are each performed by a processor.

25. The method according to claim 24, further comprising: using the bilingual dictionary with the added bilingual pairs to perform one or more of cross-language information retrieval, and cross-language categorization.

\* \* \* \* \*